Feb. 11, 1930.                    O. A. BRAUN                        1,746,762
                            DUAL CONTROL FOR AIRPLANES
                              Filed Aug. 3, 1927            3 Sheets-Sheet 3
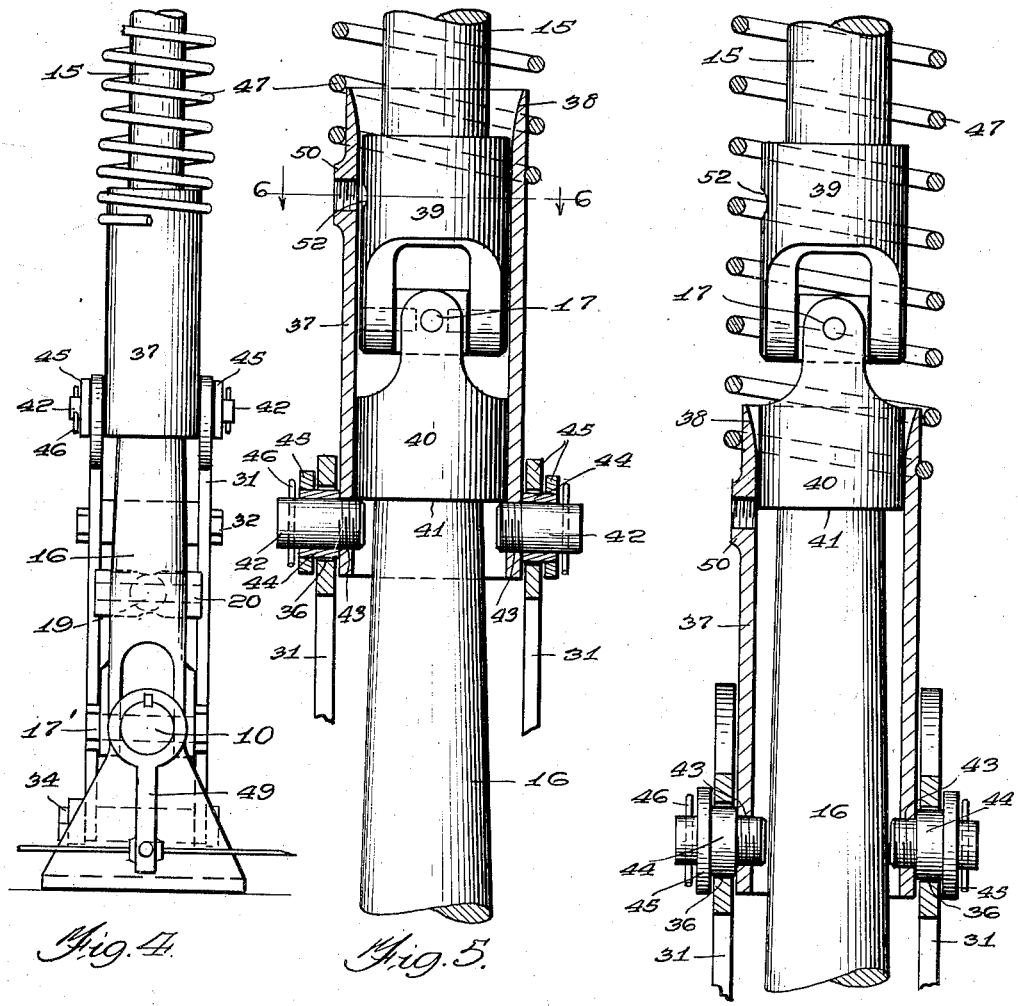
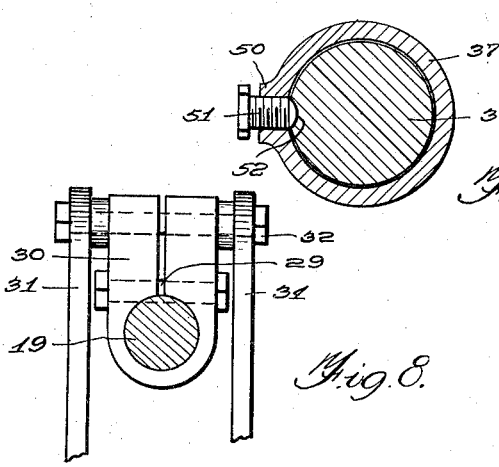
INVENTOR.
OTTO A. BRAUN,
BY
                    ATTORNEY.

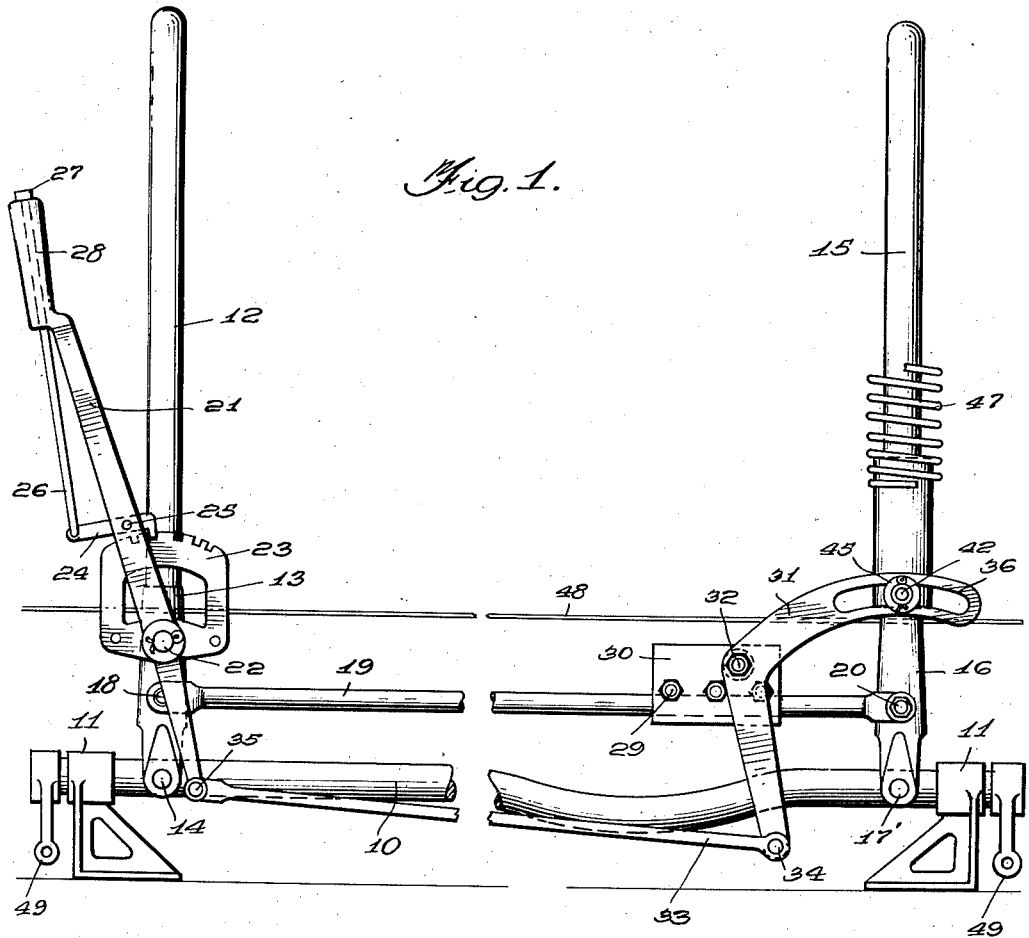
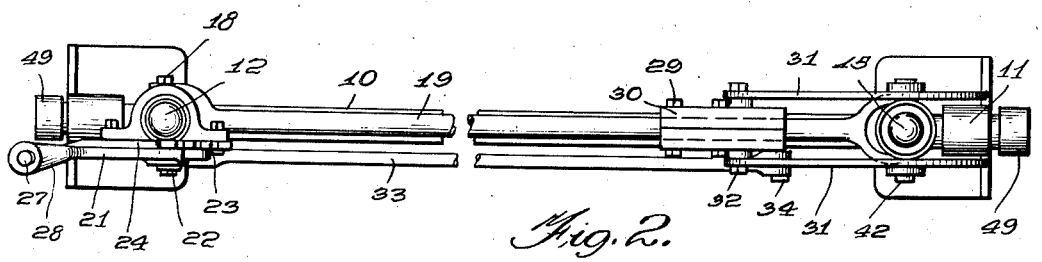

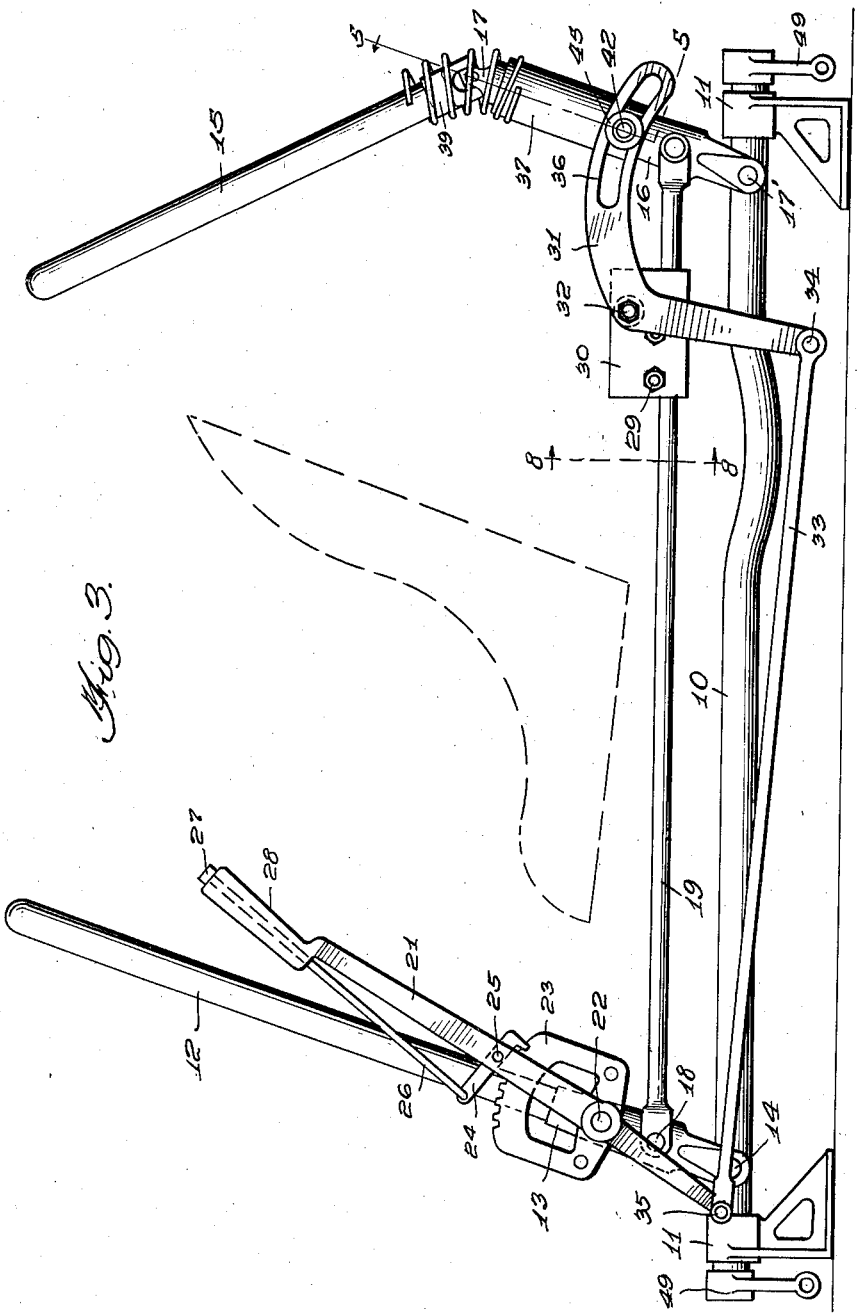

Patented Feb. 11, 1930

1,746,762

UNITED STATES PATENT OFFICE

OTTO ANTON BRAUN, OF FOND DU LAC, WISCONSIN

DUAL CONTROL FOR AIRPLANES

Application filed August 3, 1927. Serial No. 210,326.

My invention relates to a dual control for airplanes.

As is well known, it is customary to equip airplanes with a dual control, embodying a control stick for the instructor, and a control stick for the student. It not infrequently happens that in the case of an emergency, the student becomes frightened or excited and holds fast to his control stick, thereby locking the control mechanism, and preventing the instructor from properly operating the airplane. As a result of this, serious accidents have occurred.

I am aware of the fact that attempts have heretofore been made to provide a dual control, embodying means whereby the student control stick may be rendered inoperative, by the instructor, thereby placing the complete control of the airplane in the hands of the instructor.

In accordance with my invention, I provide a dual control including a control stick for the instructor and a control stick for the student. The student control stick embodies a universal joint, and this joint is normally covered by means of a sliding sleeve. When the sleeve covers the universal joint, it renders the student control stick rigid, and imparts to the same the maximum strength. Means are arranged adjacent to the instructor control stick to shift the sleeve from the universal joint of the student control stick, and when the universal joint is thus uncovered, the student control stick is rendered completely inoperative and is flexible at the universal joint, in all directions. The sleeve may be actuated regardless of the angular position of the two control sticks. The operation of the device is easy and very reliable. I also preferably provide yielding means tending to support the student control stick in a position in alinement with its supporting base, preventing the stick from falling laterally, when the sleeve uncovers the universal joint, and also aiding in the return of the sleeve over the universal joint.

In the accompanying drawings, forming a part of this specification, and in which like numerals are employed to designate like parts throughout the same, Figure 1 is a side elevation of control apparatus, embodying my invention, showing the student control stick operative, Figure 2 is a plan view of the same, Figure 3 is a side elevation of the control apparatus, showing the student control stick, rendered inoperative, Figure 4 is a rear end elevation of the apparatus, showing the student control stick, Figure 5 is a longitudinal section taken on line 5—5 of Figure 3, Figure 6 is a horizontal section taken on line 6—6 of Figure 5, Figure 7 is a view similar to Figure 5, but showing the locking sleeve lowered, Figure 8 is a detail.

In the drawings, wherein for the purpose of illustration, is shown a preferred embodiment of my invention, the numeral 10 designates a rock shaft, which may be arranged longitudinally of the airplane, when the student and instructor seats are arranged longitudinally of the machine. This rock shaft is horizontally arranged with respect to the fuselage of the airplane, and is carried by bearings, 11, rigidly attached to the fuselage.

The numeral 12 designates the instructor stick or lever, having a lower portion or base 13, permanently rigidly secured thereto. The lower end of this base is pivoted to the rock shaft 10, as shown at 14, so that the stick 12 may swing longitudinally of the rock shaft, fore and aft, and transversely, to turn the rock shaft. The stick 12 is, of course, arranged near and in advance of the instructor seat, and the student stick 15 may be arranged rearwardly of the stick 12, near and in advance of the student seat. The student stick 15 is connected with a base or lower portion 16, through the medium of a universal joint 17, of any well known or preferred type. It might be stated that when the universal joint 17 is uncovered, the stick 15 may be turned or swung in all directions with relation to the lower portion or base 16. The lower portion or base 16 is pivoted upon the rock shaft 10, at 17, to swing with relation thereto, fore and aft, and the student stick may also be shifted transversely and will then turn the rock shaft.

The lower portion or base 13 of the instructor stick has pivotal connection, as shown at 18, with a connecting rod or link 19. The pivot 18 is arranged above and spaced from the pivot 14. The rear end of the link or rod 19 is pivoted to the lower portion or base 16 of the student stick, at 20, and the pivot 20 is arranged above and spaced from the pivot 17. The rod or link 19 is generally parallel with the rock shaft 10.

The numeral 21 designates a releasing lever, arranged upon one side of the instructor control stick 12, and pivoted upon a trunnion 22, rigidly attached to the base 13 of the stick 12. The releasing lever 21 is arranged outwardly of and near a toothed-quadrant 23, rigidly carried by the base 13. This toothed-quadrant is adapted to be engaged by a latch 24, pivoted at 25, to the releasing lever, and operated by a link 26, spring-pressed upwardly, and depressed by a plunger 27, sliding in the handle 28, of the releasing lever 21, as shown. It is thus seen that the releasing lever 21 may be swung upon its pivot 22, with relation to the control stick 12, and locked in the adjusted position through the medium of the latch 24 and associated elements.

Rigidly clamped to the connecting link or rod 19 by bolts 29 or the like, is a pivotal support 30, upon the opposite sides of which are arranged bell crank levers 31, pivoted thereto at 32, to swing in a vertical plane, longitudinally of the link or rod 19. The lower arms of these bell crank levers receive therebetween a connecting rod or link 33, and are pivoted thereto at 34. This connecting rod or link extends forwardly and is pivoted at 35, to the lower end of the releasing lever 21, which extends beneath its pivot 22, for a substantial distance, as shown. The upper arms 35 of the bell crank levers 31 are longitudinally curved, and are provided with elongated slots 36, also curved, as shown.

The numeral 37 designates a locking sleeve, which is adapted to slide upon the elements of the universal joint 17, to cover such universal joint and render the student stick rigid. At its upper end, the bore of the locking sleeve is preferably tapered, as shown at 38, and increases in diameter upwardly. This enables the free passage of the locking sleeve upon the elements of the universal joint. The universal joint embodies heads 39 and 40, and the lower head 40 forms a shoulder 41, with the lower portion or base 16. The locking sleeve 37 is provided at its lower end with radial trunnions or pivots 42, the inner ends of which are preferably screw-threaded, to engage within screw-threaded openings 43 in the lower end of the sleeve 37, and these screw-threaded ends project inwardly beyond the sleeve 37, to engage beneath the shoulder 41, to limit the upward movement of the locking sleeve. The trunnions 42 carry anti-friction means, in the form of rotatable sleeves or bushings 44, upon which are mounted washers 45, these elements being retained upon the trunnions 42 by cotter pins 46, or the like. The sleeves or bushings 44 are mounted within the curved slots 36 of the bell crank levers 31, as shown.

The numeral 47 designates a suitably stiff retractile coil spring surrounding the student stick 15 and having its upper end welded or otherwise rigidly attached to the student stick. The lower end of this spring is welded or rigidly attached to the locking sleeve 37. The function of this spring is to aid in returning the locking sleeve 37 to the raised or active position, and to also hold the stick 15 in alinement with its lower portion or base 16, when its universal joint is uncovered, by the locking sleeve, preventing the control stick 15 from falling laterally, when not held by the student. The fore and aft movement of the control sticks 12 and 13 control the action of the elevation rudders, and are suitably connected therewith by means including a cable 48. The transverse movement of the control sticks 12 actuate the transverse control means of the airplane. For this purpose, the rock shaft 10 may be equipped with cranks 49, which will be suitably connected with the ailerons. It is thus seen that a two-way control is provided. Any suitable means may be employed to control the vertical or direction rudder.

The locking sleeve is preferably equipped with a boss 50, screw-threaded for receiving a set screw 51, adapted to engage within a recess 52, formed upon the upper element 39 of the universal joint. This set screw is only employed when it is desired to render the student stick permanently rigid, and when it is desired to retain the control of the airplane in the hands of the instructor, the set screw 51 is removed.

The operation of the apparatus is as follows:

With the releasing lever 21 in the forward position, the locking sleeve 37 is raised, and covers the universal joint 17, rendering the student stick rigid or operative. Hence the control of the airplane is in the hands of both the instructor and student. In the event of accident, or the like, the instructor swings the releasing lever 21 rearwardly, and this movement draws the rod or link 33 forwardly, which swings the upper arms 35 of the bell crank levers 31 downwardly. This movement of the bell crank levers shifts the locking sleeve 37 downwardly to a position to uncover the universal joint 17, whereby the student stick 15 will swing in all directions upon the universal joint and will be inoperative, with respect to swinging the lower section or base 16. Under these conditions, the spring 47 will hold the control stick 15 in alinement with the base 16, preventing the control stick from falling laterally when not held by the student. It is obvious that the student control stick is again rendered operative by shifting the releasing lever 21 forwardly.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. In a dual control for airplanes, an instructor stick, a student stick including sections and a universal joint connecting them, a locking sleeve slidable upon the student stick to cover the universal joint, a coil spring surrounding the student stick and attached to the upper section and to the sleeve and adapted to hold the upper section when the sleeve is shifted to a position to uncover the universal joint in alinement with the lower section, means to move the sleeve, and control means operated by said sticks.

2. In a dual control for airplanes, a rock shaft, an operator stick pivoted upon the rock shaft to swing longitudinally thereof, a student stick pivoted upon the rock shaft to swing longitudinally thereof and embodying sections and a pivot joint connecting them, rocking means for holding one section of the pivot stick from turning movement upon its pivot with relation to the other section, a rod pivotally connecting with said sticks and movable longitudinally with them when the sticks are swung upon their pivots which connect them with the rock shaft, a releasing lever pivoted upon the instructor stick and projecting downwardly beyond its pivot, a bell crank lever pivotally mounted upon the longitudinally movable rod and movable bodily with such rod and adapted to be turned upon its pivot with relation thereto, said bell crank lever embodying an upper generally horizontal arm and a depending generally vertical arm, the upper generally horizontal arm having a longitudinally curved slot adapted to be arranged generally concentric with the pivot of the student stick, a pin connected with the locking means and operating within the slot, and a rod connecting the lower ends of the releasing lever and the lower end of the generally vertical arm of the bell crank lever.

In testimony whereof I affix my signature.

OTTO ANTON BRAUN.